(12) United States Patent
Kristjansson

(10) Patent No.: US 9,892,731 B2
(45) Date of Patent: Feb. 13, 2018

(54) METHODS FOR SPEECH ENHANCEMENT AND SPEECH RECOGNITION USING NEURAL NETWORKS

(71) Applicant: Trausti Thor Kristjansson, San Jose, CA (US)

(72) Inventor: Trausti Thor Kristjansson, San Jose, CA (US)

( * ) Notice: Subject to any disclaimer, the term of this patent is extended or adjusted under 35 U.S.C. 154(b) by 0 days.

(21) Appl. No.: 15/278,438

(22) Filed: Sep. 28, 2016

(65) Prior Publication Data

US 2017/0092268 A1    Mar. 30, 2017

Related U.S. Application Data

(60) Provisional application No. 62/233,446, filed on Sep. 28, 2015.

(51) Int. Cl.
*G10L 15/16* (2006.01)
*G10L 15/20* (2006.01)
*G10L 15/06* (2013.01)
*G10L 21/0216* (2013.01)

(52) U.S. Cl.
CPC .......... *G10L 15/20* (2013.01); *G10L 15/16* (2013.01); *G10L 15/063* (2013.01); *G10L 21/0216* (2013.01)

(58) Field of Classification Search
CPC ..... G10L 15/20; G10L 21/0208; G10L 25/78; G10L 21/0216; G10L 15/065; G10L 21/0232; G10L 25/48; G10L 2021/02168; G10L 21/0272; G10L 15/02; G10L 15/142; G10L 15/144; G10L 2021/02166; G10L 25/18; G10L 25/24
USPC ................ 704/200–230, 500–504, 232, 233, 704/256–256.7
See application file for complete search history.

(56) References Cited

U.S. PATENT DOCUMENTS

2005/0182624 A1\*  8/2005  Wu ...................... G10L 21/0208
                                                            704/233
2010/0070280 A1\*  3/2010  Yu ......................... G10L 15/142
                                                            704/256.2

\* cited by examiner

*Primary Examiner* — Huyen Vo

(57) ABSTRACT

The present invention relates to implementing a system and method to improve speech recognition and speech enhancement of noisy speech. The present invention discloses a way to improve the noise robustness of a speech recognition system by providing additional input to a Neural Network speech classifier. The additional information characterizes the noise environment of the speech. The present invention further discloses a speech separation system that uses the output of the neural network. The speech separation system employs models for the speech and for the distractor or noise. The neural network is used to identify the most likely combinations of speech and noise. Furthermore, a system for efficiently finding the most likely clean speech log-spectrum value is disclosed.

13 Claims, 8 Drawing Sheets

METHODS FOR SPEECH ENHANCEMENT AND SPEECH RECOGNITION USING NEURAL NETWORKS

CROSS-REFERENCE TO RELATED APPLICATIONS

This application claims the benefit of U.S. Provisional Patent Application No. 62/233,446 filed Sep. 28, 2015 by the present inventor, which is incorporated by reference.

BACKGROUND OF THE INVENTION

The present invention relates to speech processing. In particular, the present invention relates to a method for speech enhancement and speech recognition in noisy environments.

Automatic speech recognition is an important technology that is used in mobile devices and other devices. In general, automatic speech recognition attempts to provide accurate transcriptions of what a person has said.

In speech recognition, it is common to condition the speech signal to remove noise and portions of the speech signal that are not helpful in decoding the speech into text. For example, it is common to apply a frequency-based transform to the speech signal to reduce certain frequencies in the signal that do not aid in decoding the speech signal.

Speech systems also attempt to enhance the speech signal by removing noise before performing speech recognition. Under some systems, this is done in the time domain by applying a noise filter to the speech signal. In other systems, this enhancement is performed using a two-stage process in which the pitch of the speech is first tracked using a pitch tracker and then the pitch is used to separate the speech signal from the noise. For various reasons, such two-stage processing is undesirable.

An alternate system for removing noise from a speech signal attempted to identify a clean speech signal in a noisy signal using a probabilistic framework that provided a Minimum Mean Square Error (MMSE) estimate of the clean signal given a noisy signal.

There clearly is a need for improving capabilities in the art of speech recognition when it comes to recognition accuracy in high noise environments.

Additionally, there is clearly a need for improving the ability of speech enhancement systems to separate a target speaker from background noise and background speakers.

U.S. Pat. No. 955,483 (Senior et al.) discloses a system for performing speech recognition using Neural Networks.

U.S. Pat. No. 7,664,643 (Gopinath et al.) discloses a system for doing speech separation and speech enhancement in a probabilistic framework.

U.S. Pat. No. 7,596,494 (Kristjansson et al.) discloses a system for speech enhancement using a high resolution signal representation.

U.S. Pat. No. 6,985,858 (Frey et al.) discloses a method for doing robust speech recognition.

"Spectral intersections for non-stationary signal separation" (Trausti Kristjansson and Thad Hughes) discloses a method for inference for speech enhancement that uses spectral intersections.

SUMMARY OF THE INVENTION

The current invention introduces a method to perform noise robust speech recognition and speech enhancement.

The invention uses a noise environment vector input to a neural network in order to improve noise robustness for speech recognition and speech enhancement.

The invention uses a neural network to identify the best component to use for re-synthesis, i.e. to compute the posterior component in an MMSE framework. i.e. computing $P(s_{i,j}|Y,N_j)$ in equation 9 using a neural network.

The invention introduces a method to find the most likely combination of speech and noise. The speech component is used for re-synthesizing cleaned speech. This is the Newton Raphson method to find $\hat{x}$ in equation 9

DETAILED DESCRIPTION OF THE INVENTION

Figure 1:
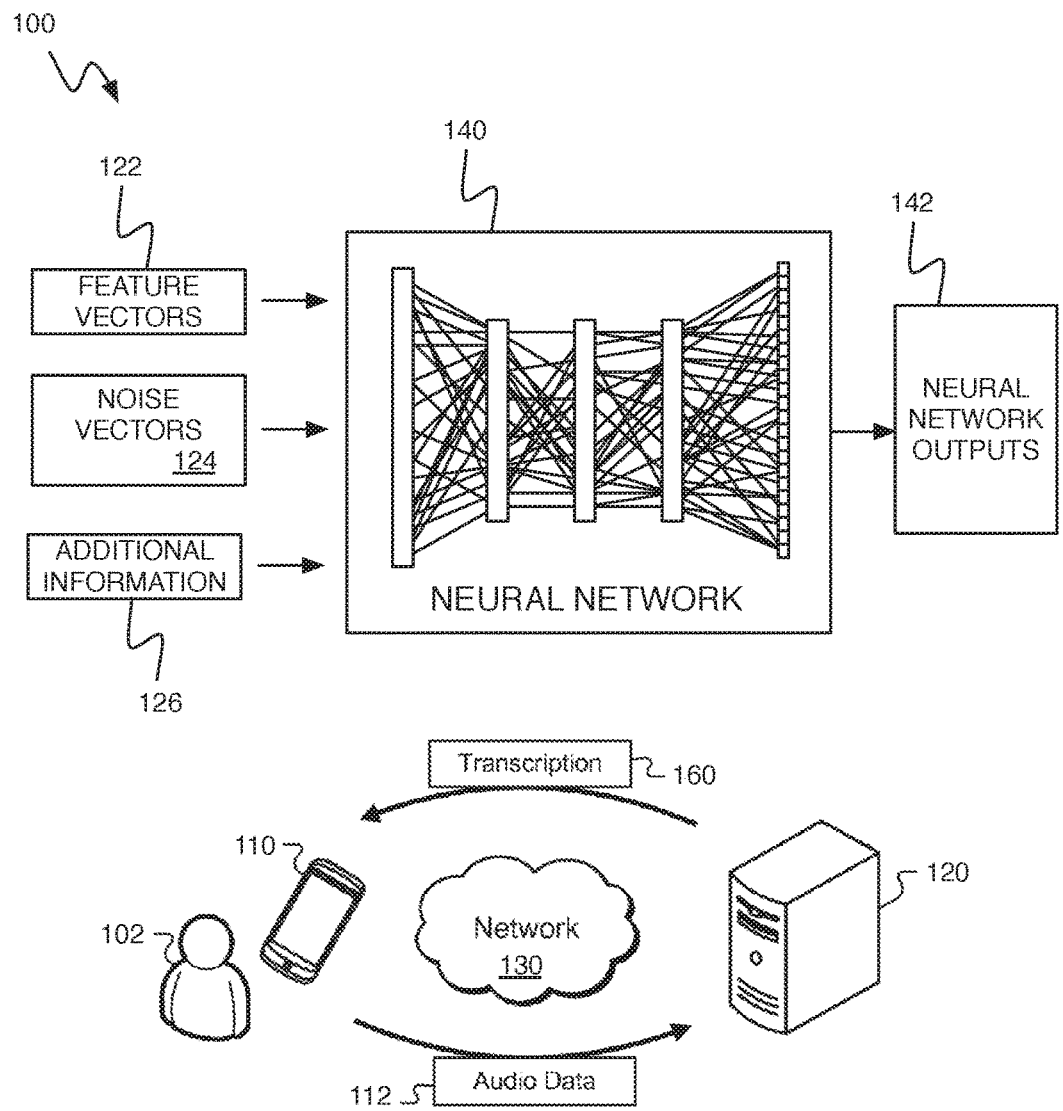
FIG. 1 is a block diagram that illustrates an example of a system 100 for speech enhancement or speech recognition using neural networks.

FIG. 1 is a block diagram that illustrates an example of a system 100 for speech enhancement or recognition using neural networks. The system 100 includes a client device 110, a computing system 120, and a network 130. In the example, the computing system 120 provides information about an utterance and additional information to a neural network 140. The computing system 120 uses output from the neural network 140 to identify a transcription for the utterance.

In some implementations, the computing system 120 receives a feature vector that models audio characteristics of a portion of an utterance. The computing system may receive data indicative of latent variables of multivariate factor analysis. The computing system 120 may provide, as input to a neural network, the feature vector and the data indicative of the latent variables. The computing system 120 may determine a candidate transcription for the utterance based on at least an output of the neural network.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the computing system 120 can be performed by individual computer systems or can be distributed across multiple computer systems. The network 130 can be wired or wireless or a combination of both and can include the Internet.

In the illustrated example, a user 102 of the client device 110 speaks, and the client device 110 records audio that includes the speech. The client device 110 transmits the recorded audio signal 112 to the computing system 120 over the network 130.

The computing system 120 receives the audio signal 112 and obtains information about acoustic features of the audio signal 112. For example, the computing system 120 may generate a set of feature vectors 122, where each feature vector 122 indicates audio characteristics during a different portion or window of the audio signal 112. Each feature vector 122 may indicate acoustic properties of, for example, a 10 millisecond (ms), 25 ms, or 50 ms portion of the audio signal 112.

The computing system 120 can receive information about the noise environment 124. The noise environment information can represent the stationary characteristics of the noise environment or the non-stationary characteristics.

The noise environment information 124 can include a representation of the audio signal 112 or of one or more other audio signals. The noise representation may be accessed from data storage, received from another system, or calculated by the computing system 120. To obtain the noise environment information 124, the feature vectors 112, or other feature vectors derived from the audio signal 112, may be analyzed by a noise environment module. The result of processing with the noise environment module can be a noise-vector, as discussed further below.

The computing system 120 may also obtain additional information 126. The additional information 126 may be indicative of audio characteristics that are independent of the words spoken by the user 102. For example, the additional information 126 may indicate audio features that correspond to one or more of recording channel properties, the speaker's speaking style, the speaker's gender, the speaker's age, and/or the speaker's accent. While the feature vectors 122 may be indicative of audio characteristics of specific portions of the particular words spoken, the noise vector 124 may be indicative of the stationary and non-stationary noise environment the additional information 126 may be indicative of general characteristics of the audio signal 112.

In the illustrated example, the computing system 120 inputs the feature vectors 122, the noise vector 124 and the additional data 126 to the neural network 140. The neural network 140 has been trained to act as an acoustic model. For example, the neural network 140 indicates likelihoods that feature vectors correspond to different speech units when the feature vectors and certain types of additional information are provided.

The neural network 140 produces neural network outputs 142, which the computing system 120 uses to identify a transcription 160 for the audio signal 112. For example, the computing system 120 may provide the neural network outputs 142 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 160 may be derived. The computing system 120 then provides the transcription 160 to the client device 110 over the network 130.

Figure 2:
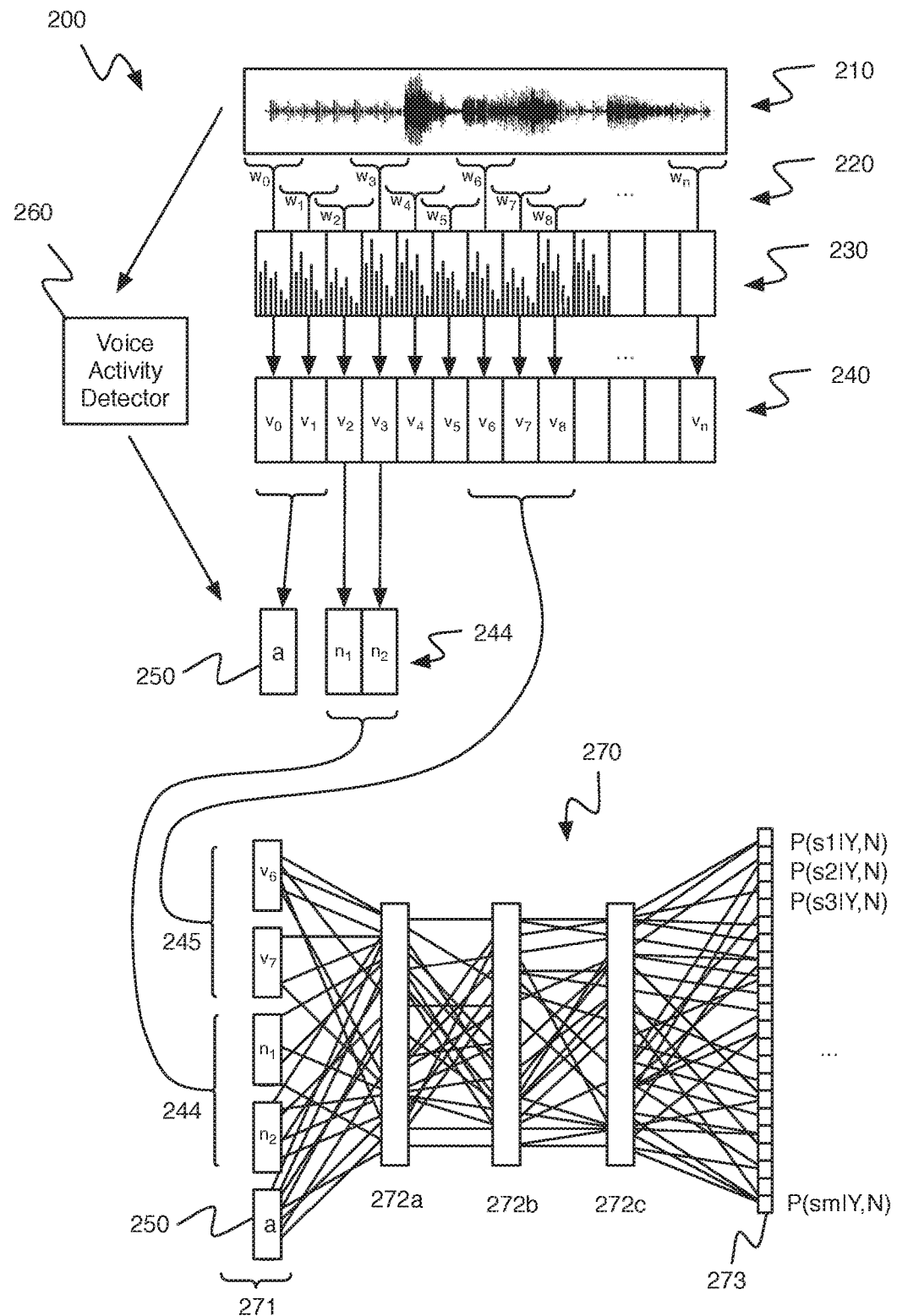
FIG. 2 is a diagram 200 that illustrates an example of processing for enhancement or speech recognition using neural networks.

FIG. 2 is a diagram 200 that illustrates an example of processing for speech enhancement or recognition using neural networks. The operations discussed are described as being performed by the computing system 120, but may be performed by other systems, including combinations of multiple computing systems.

The computing system 120 receives data about an audio signal 210 that includes noise and speech to be enhanced or recognized. The computing system 120 or another system then performs feature extraction on the audio signal 210. For example, the computing system 120 analyzes different segments or analysis windows 220 of the audio signal 210. The windows 220 are label w0, . . . wn, and as illustrated, the windows 220 can overlap. For example, each window 220 may include 25 ms of the audio signal 210, and a new window 220 may begin every 10 ms. For example, the window 220 labeled w0 may represent the portion of audio signal 210 from a start time of 0 ms to an end time of 25 ms, and the next window 220, labeled w1, may represent the portion of audio signal 120 from a start time of 10 ms to an end time of 35 ms. In this manner, each window 220 includes 15 ms of the audio signal 210 that is included in the previous window 220.

The computing system 120 performs a Fast Fourier Transform (FFT) on the audio in each window 220. The results of the FFT are shown as time-frequency representations 230 of the audio in each window 220. From the FFT data for a window 220, the computing system 120 extracts features that are represented as an acoustic feature vector 240 for the window 220. The acoustic features may be magnitude spectrum values or log-magnitude spectrum values. The acoustic features may be determined by binning according to filterbank energy coefficients, using a Mel-Frequency Cepstral Component (MFCC) transform, using a perceptual linear prediction (PLP) transform, or using other techniques. In some implementations, the logarithm of the energy in each of various bands of the FFT may be used to determine acoustic features.

The acoustic feature vectors 240, labeled v1 . . . vn, include values corresponding to each of multiple dimensions. As an example, each acoustic feature vector 240 may include a value for each of the frequencies of the log spectrum.

Additionally, each acoustic feature vector 240 may include a vale for a PLP feature, a value for a first order temporal difference, and a value for a second order temporal difference, for each of 13 dimensions, for a total of 39 dimensions per acoustic feature vector 240. Each acoustic feature vector 240 represents characteristics of the portion of the audio signal 210 within its corresponding window 220.

The computing system 120 also obtains a noise-vector 250. For example, the computing system 120 may process the audio signal 210 with an voice activity detector 260 to obtain the noise-vector 250. In the example, the noise-vector 250 indicates a time varying summary of the noise environment.

The computing system 120 also obtains copies of feature vectors that represent the background environment 244. For example, the computing system 120 may process the audio signal 210 with a Voice Activity Detector which analyses each feature vector to determine if speech from the target speaker is present. In this example 244 contains copies of recent feature vectors that represent the dynamic, time varying noise background signal. These vectors may for example contain background noise such as car noise, road noise, office noise, babble noise or voices of background speakers.

The noise-vector 250 and non-speech vectors 244 may be normalized, for example, to have a zero mean unit variance. In addition, or as an alternative, the noise-vector 250 may be projected, for example, using principal component analysis (PCA) or linear discriminant analysis (LDA). Techniques for obtaining an noise vector are described further below with respect to FIG. 3.

The computing system 120 uses a neural network 270 that can serve as an acoustic model and indicate likelihoods that acoustic feature vectors 240 represent different phonetic units. The neural network 270 includes an input layer 271, a number of hidden layers 272a-272c, and an output layer 273. The neural network 270 receives a noise-vector 250 and non-speech vectors 244 as input as well as receiving acoustic feature vectors 245. Many typical neural networks used for speech enhancement or recognition include input connections for receiving only acoustic feature information. By contrast, the neural network 270 receives acoustic feature information augmented with additional information such as a noise-vector and non-speech vectors. For example, the first hidden layer 272a has connections from the noise-vector input portion of the input layer 271, where such connections are not present in typical neural networks used for speech enhancement or recognition.

The neural network 270 has been trained to estimate likelihoods that a combination of feature vectors and a noise-vector and non-speech vectors that represent particular phonetic units. For example, during training, input to the neural network 270 may be a combination of acoustic feature vectors and a noise-vector corresponding to the utterance from which the acoustic feature vectors were derived. Many inputs combining acoustic feature vectors and a noise-vector can be used to train the neural network 270, and the various training data sets can include acoustic feature vectors and noise-vectors derived from utterances from multiple speakers.

To enhance or recognize speech in the audio signal 210 using the neural network 270, the computing system 120 inputs the noise-environment-vector 250 and 244 at the input layer 271 of the neural network 270 with different sets of acoustic feature vectors 240. In the example, the neural network 270 receives a set 245 of acoustic feature vectors 240 that includes (i) an acoustic feature vector 240 for a window 220 of speech to be enhanced or recognized and (ii) one or more acoustic feature vectors 240 that serve as context. The set 245 can include acoustic feature vectors 240 corresponding to a predefined number of consecutive windows 220. In the example, the set 245 includes the acoustic feature vector 240 labeled $v_7$, which indicates features of audio in the window 220 labeled $w_7$. As context for this feature vector, the set 245 also includes the acoustic feature vectors 240 labeled $v_6$ and $v_8$, which respectively indicate features of audio in the windows 220 immediately preceding and immediately following the window 220 labeled $w_7$. The set 245 of acoustic feature vectors 240 and the noise-vector 250 are concatenated or stacked together to form the complete input to the neural network 270.

At the output layer 273, the neural network 270 indicates likelihoods that the speech in the window 220 under analysis (e.g., the window $w_7$ corresponding to acoustic feature vector $v_7$) corresponds to specific phonetic units. In some implementations, the phonetic units used are phones or components of phones. In the example, potential phones are referred to as s0 . . . sm. The phones may be any of the various phones in speech, such as an ah phone, an ae phone, a zh phone, and so on. The phones s0 . . . sm may include all of the possible phones that may occur in the audio signal 210, or fewer than all of the phones that may occur.

The output layer 273 provides predictions or probabilities of acoustic states given the data at the input layer 271. The output layer 273 can provide a value, for each state of the speech acoustic model, that indicates the probability that the acoustic feature vector $v_6$ represents the particular state of the speech acoustic model. For example, for a first state, $s_0$, the output layer 273 can provide a first value that indicates a probability $P(s_0|Y,N)$, which indicates a probability that the window $w_1$ includes the first acoustic state $s_0$, given the set of input, Y,N provided at the input layer 271. Similar outputs can be provided for all states of the speech acoustic model s0 . . . sm.

The computing system 120 provides different sets of acoustic feature vectors 240 to the neural network 270 to receive predictions or probabilities of the acoustic states in the different windows 220. The computing system 120 may apply a sliding window to the acoustic feature vectors 240 to select different sets. In the example, the sliding window has a size of three acoustic feature vectors 240. For example, the computing system 120 may provide acoustic feature vectors 240 $v_5$, $v_6$, and $v_7$ and the noise-vector 250 as input to the neural network 270 to obtain output values regarding the speech in window $w_6$. The computing system 120 may provide acoustic feature vectors 240 $v_6$, $v_7$, and $v_8$ and an updated noise-vector 250 as input to the neural network 270 to obtain output values regarding the speech in the window $w_7$. In this manner, the computing system 120 may obtain outputs corresponding to each position of the sliding window across the acoustic feature vectors 240.

As the sliding window is moved across the acoustic feature vectors 240 and different sets of acoustic feature vectors 240 are input to the neural network 270, different noise-vectors 250 may be included in the input. The noise-vector 250 indicates time varying or dynamic properties of the audio signal 210. As a result, the information in the noise-vector 250 is not independent of the particular acoustic states that may occur at specific windows 220.

The output of the neural network 270 can be provided to a set of weighted finite state transducers that represents a language model composed with context information, a lexicon, and a grammar. The set of weighted finite state transducers can approximate an HMM. The weighted finite ate transducers output a word lattice that the computing system 120 can use to determine a transcription for the audio signal.

For speech enhancement, the output of the neural network 270 can be provided to a Minimum Mean Squared Error or Maximum Posteriori based speech enhancement or source separation system, such as a high resolution speech separation system. The posterior $P(s_i|Y,N)$ can correspond to the components of the acoustic model of the speech separation system. The speech separation system can use the posterior 273 to choose which component of the acoustic model to use to reconstruct or separate the target speech from the noisy acoustic signal. The computing system 120 can use to determine the separation of the target speaker from the background noise environment for the audio signal.

As indicated above, each output from the neural network 270 can include a posterior probability $P(s_i|Y,N)$, representing a likelihood of a particular acoustic state $s_i$ given the current set of input data, Y,N. In some implementations, the computing system 120 divides the posterior, $P(s_i|Y)$ by the prior, $P(s_i)$, to generate a scaled posterior probability for each output. The resulting scaled posterior probabilities are then input to the weighted finite state transducers or speech enhancement system for further processing.

In the example of FIG. 2, the sliding window of acoustic feature vectors 240 includes three acoustic feature vectors 240. More or fewer acoustic feature vectors 240 may be provided in each set of input to the neural network 270. For example, 2, 3, 5, 10, or another number of feature vectors for windows 220 before and after a central vector may be input simultaneously to the neural network 270.

In some implementations, the noise-vectors 250, 244 are a current utterance noise-vector derived from the current utterance (e.g., the particular audio signal 210) being enhanced or recognized. In some implementations, the noise-vector 250, 244 is derived from audio signals other than the audio signal 210 containing the utterances being enhanced or recognized. For example, the noise-vector 250 may be derived from a prior utterance of the same speaker whose utterances are included in the audio signal 210.

Recognition later may be reduced by using noise-vectors that are computed prior to receiving some or all of the audio signal 210. For example, the computing system 120 may use a pre-computed noise-vector derived from other utterances to begin recognizing initial portions of the audio signal 210, without waiting for the entire audio signal 210 to be received. Thus the recognition techniques described above may be used in a continuous speech recognition or streaming scenario in which recognition proceeds while audio streams in.

In some implementations, the computing system 120 may identify the speaker and location and select a noise-vector based on the speaker's identity and location. A noise-vector may be calculated for each of multiple users, and the noise-vectors may be stored for later use in recognizing speech of the corresponding users and locations. The computing system 120 may receive a device identifier for a device, such as a mobile phone, that the speaker is using to record speech. The computing system may also receive location coordinates such as GPS coordinates indicating the user's location. In addition, or as an alternative, the computing system 120 may receive a user identifier that identities the user, such as a name or user account login. The computing system 120 may identify the speaker as a user that owns the device or a user is logged into a user account on the device. In some implementations, the computing system 120 may identify the speaker before recognition begins, or before audio is received during the current session. The computing system 120 may then look up the noise-vector that corresponds to the identified user and the location and use that noise-vector to enhance or recognize received speech.

In some implementations, a successive approximation technique may be used to approximate and re-estimate the noise-vector 250 while audio is received. The noise-vector 250 may be re-estimated for each frame.

In some implementations, to reduce latency, the computing system 120 may enhance or recognize the initial portion of an utterance with an acoustic model that does not receive a noise-vector as input. For example, a neural network trained as an acoustic model using only acoustic feature vectors as inputs or another acoustic model may be used. After receiving a threshold amount of audio that permits reliable estimation of an noise-vector, a noise-vector is been calculated based on the received audio. The computing system 120 may then switch from recognizing received audio using the neural network that does not receive noise-vectors to recognizing speech using the neural network 270 that has been augmented to receive noise-vectors as input.

Figure 3:
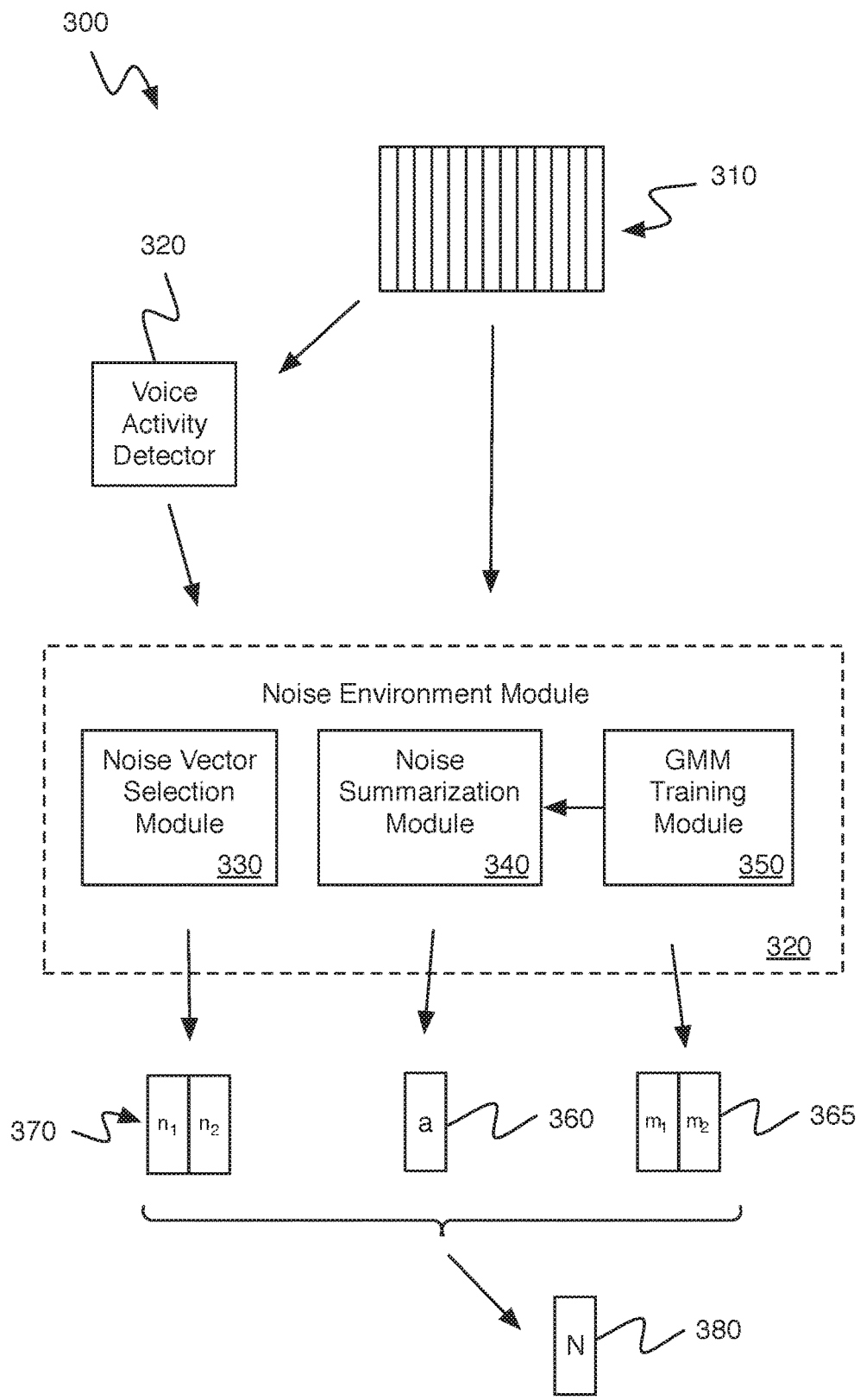
FIG. 3 is a diagram 300 that illustrates an example of processing to generate noise vectors.

FIG. 3 is a diagram 300 that illustrates and example of processing to generate noise environment vectors 380. The example of FIG. 3 shows techniques for determining noise vectors. Noise vectors are data vectors that characterize the noise of an audio signal. The vector can characterize the overall noise characteristics of the audio signal as well as the recent noise characteristics. The noise vectors can summarize the noise characteristics, for example by averaging or they can be a set of unaltered feature vectors e.g. feature vectors that do not contain speech as determined by a Voice Activity Detector (VAD). Noise vectors can be re-synthesized feature vectors from the noise component of the speech-noise separated signal.

The example of FIG. 3 illustrates processing to calculate noise-vectors 380 for a sample utterance 310. Each of the acoustic feature vectors can be, for example, a 128-dimensional log spectrum vector determined in the same manner that the acoustic feature vectors 240 are determined in the example of FIG. 2.

The Noise Environment Module 320 may consist of sub-modules such as a Feature Vector Selection Module 330 that has the purpose of selecting frames 370 to be included in the noise-vector 380 and a Noise Summarization Module 340 that has the purpose of generating an vector 360 that is a compact representation of the noise environment. The Noise Summarization Module may include a Gaussian Model Training Module 350 that estimates a GMM model of the noise environment $$p(y) = \sum_j p(s_j)N(y; \mu_j, \Sigma_j). \tag{1}$$

where $\mu_j$ is the mean of the jth component and $\Sigma_j$ is the covariance matrix of the jth component and $p(s_j)$ is the prior probability for component j. If a VAD is used, this model can for example be trained from the noise portions of the audio signal.

For stationary noise environments such as car noise, the Noise Summarization Module 340 may provide a compact representation the noise characteristics 360. For non-stationary noise environments such as in a cafeteria, the Feature Vector Selection Module 330 may provide a detailed sampling of the different background sounds that occur in the environment.

A Voice Activity Detector (VAD) can 320 determine if each vector of the sample utterance 310 contains speech from the target speaker or background noise and speech.

The computing system 120 inputs the VAD determination and the feature vectors 310 for the sample utterance 320. The Feature Vector Selection Module (FVSM) can select vectors to be included in the noise environment vector 380. The Feature Vector Selection Module may select up to mN vectors where mN can for example vary from 1 to 20 $n_1, \ldots, n_{mN}$. The FVSM may select vectors more densely that are close in time to the vector being processed by the Neural Network and fewer for frames that are farther away in time from the vector being processed by the Neural Network. For example, the FVSM module may select the 5 most recent noise frames prior to the vector being processed by the Neural Network, and 5 noise frames sampled every 10 frames prior to the 5 most recent noise frames for a total of 10 vectors.

The Feature Vector Selection Module (NVSM) may use other criteria such as the distance from the average noise. The distance metric can be the geometric distance to the closest of the previously selected vectors. The distance metric can be the probability P(Y|noisemodel) under an average noise model provided by the GMM training module 350. The vector can be selected if the distance metric for the vector exceeds a threshold. The previous vector can be discarded to make room for the new vector.

The Noise Summarization Module (NSM) 340 provides a compact presentation of the noise environment. The noise summarization can for example compute the average of the mA most recent frames as determined by the VAD, where mA can for example be 10 to 100. The average is output to the average noise vector a 360.

The noise vector 360 can contain the vector provided by the Feature Selection Model $n_1, \ldots, n_{mN}$ as well as the Noise Summarization Module a, stacked up to form a vector N.

$$N=[n_1, \ldots, n_{mN}, a] \quad (2)$$

The NSM 340 can employ a GMM training module 350. A noise model GMM can for example be trained with the most recent 100 non-target-speaker vectors from the audio signal. The GMM can for example contain from 1 to 16 Gaussian mixtures that compactly model the non-stationary noise environment.

The noise vector 360 can also contain the parameters 365 of the mixture components of the noise GMM, where $$N=[n_1, \ldots, n_{mN}, a, m_1, \ldots, m_{nG}]. \quad (3)$$

where m could be the means or variances of the mixture components.

Alternately, when used for Speech Enhancement, the Noise vector can contain only a single component of the noise model $$N_j=[n_1, \ldots, n_{mN}, a, m_j] \quad (4)$$

where $m_j$ is the jth component of the GMM model.

When used for speech enhancement, it may be desirable to compute different posterior probabilities for different components the noise model. For example, the noisy model can be a GMM model that contains 4 mixtures that represent different background noises. It may be desirable to compute a different posterior $P(s_i|Y,N)$ for each of the background noise components. This may be accomplished by presenting the different components of the noise model to the network one at a time in sequence to compute $$P(s_{i,j}|Y,N_j) \quad (5)$$

where $s_{i,j}$ is a combined state $s_i$ for the speech acoustic state and $s_j$ for the noise model state.

Figure 4:
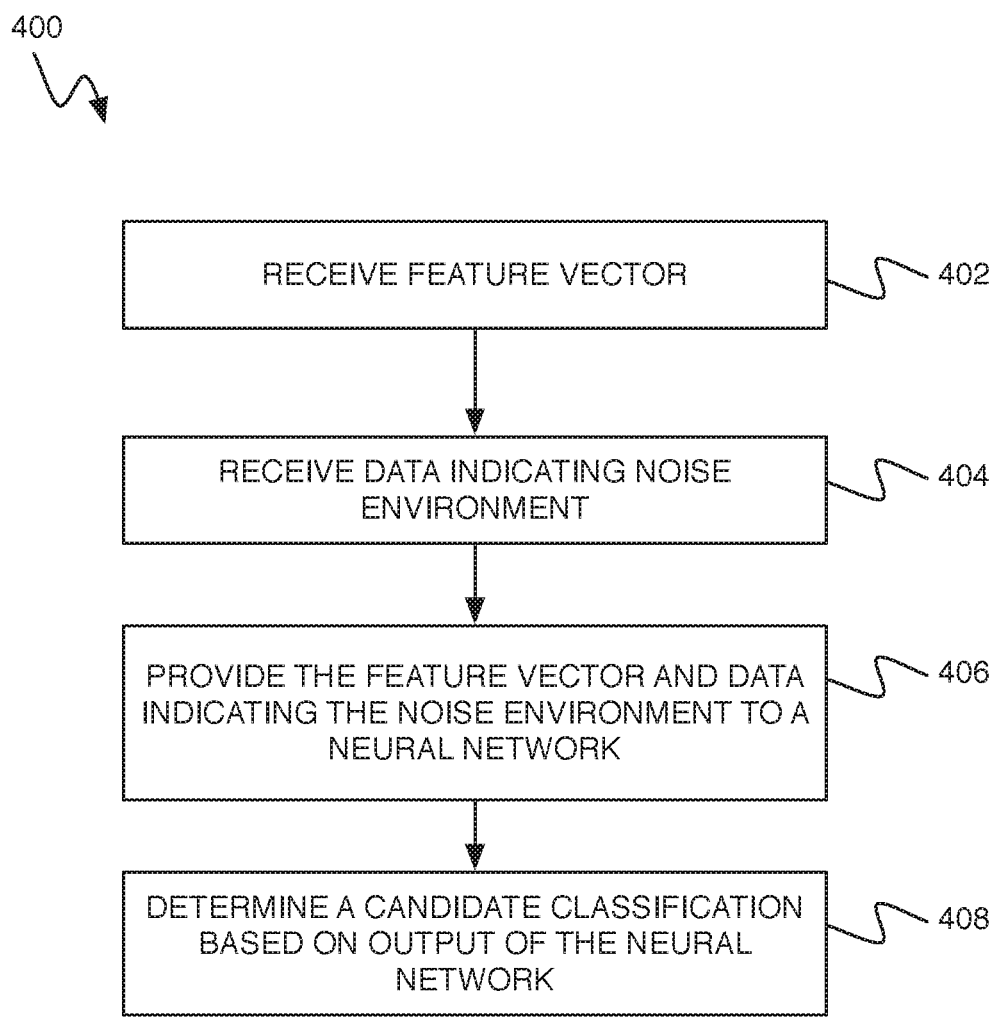
FIG. 4 is a flow diagram that illustrates an example of a process 400 for speech enhancement or speech recognition using neural networks.

FIG. 4 is a flow diagram that illustrates an example of a process 400 for speech recognition using neural networks. The process 400 may be performed by data processing apparatus, such as the computing system 120 described above or another data processing apparatus.

A feature vector that models audio characteristics of a portion of an utterance is received (402). The feature vector can include values that indicate acoustic features for each of multiple dimensions. In some implementations, multiple feature vectors are received, where each feature vector indicates characteristics of a different segment of the utterance.

Data indicative of the noise environment is received (404). The data can indicate audio characteristics that are independent of the particular words that were spoken in the utterance. The data can be indicative of noise environment of an audio signal that (i) does not include the spoken portions of the recording and (ii) includes other utterances uttered by the speaker in the same environment. For example, the data can be derived from speech in a prior recording session or on a different day. The data may be derived from multiple audio signals that include speech of the speaker, recorded on different days or during different recording sessions.

The feature vector and the data indicative of the noise environment is provided as input to a neural network (406). Multiple feature vectors may be provided as part of the input. The feature vector(s) and the data indicative of the latent variables are input together (e.g., simultaneously) as part of a single input data set. For example, the feature vector(s) and data indicative of the noise environment may be combined into a single input vector which is input to the neural network. In this manner, a set of input data to the neural network includes a time-dependent component, e.g., the acoustic feature vector(s) representing characteristics of specific windows of the utterance, and a long term component, e.g., a noise environment vector that represents general noise characteristics of the utterance as a whole.

The neural network can be a neural network that has been trained using audio feature data and data indicative of the noise environment corresponding to the audio feature data. The neural network may have been trained to provide estimates of probabilities of one or more phones or acoustic states based on input that includes a combination of one or more feature vectors and data indicative of the noise environment.

A candidate transcription for the utterance based on at least an output of the neural network (408). The output of the neural network can indicate a likelihood that the feature vector, or the entire set of input to the neural network, corresponds to a particular phonetic unit, and the candidate transcription can be determined based on this likelihood.

In some implementations, the speaker is identified. For example, an identifier for the speaker or an identifier for a device that records the utterance is received, and the speaker is identified based on the received identifier. The data indicative of the noise environment may be selected based on the location of the speaker. For example, data indicating the noise environment may be determined for a particular speaker and stored in association with the location identifier, and then may be accessed and used to enhance or recognize utterances from the identified location.

The process 400 may include recognizing a first portion of a speech sequence by providing a feature vector to an acoustic model that does not receive data indicative of the noise environment as input. After recognizing the first portion of the speech sequence, it may be determined that at least a minimum amount of audio of the speech sequence has been received. The utterance may occur in the speech sequence after the first portion, and the received data may be indicative of the noise environment of received audio including the first portion of the speech sequence. To provide input to the neural network, the input may be provided to neural network that is different from the acoustic model used to enhance or recognize the first portion of the speech sequence.

The process 400 may include receiving a second feature vector that models audio characteristics of a second portion of the utterance. The second feature vector and the data indicative of the latent variables are provided as input to the neural network. A second output of the neural network is received, and the candidate transcription for the utterance is determined based on at least the first output of the neural network and the second output of the neural network.

In some implementations, the same data indicative of variables of multivariate factor analysis is input to the neural network with different feature vectors or different sets of feature vectors representing portions of the utterance. For example, a second feature vector that models audio characteristics of a second portion of the utterance can be received. The second feature vector and the data indicative of the latent variables can be provided as input to the neural network. A second output from the neural network in response to the second set of input to the neural network. The candidate transcription for the utterance may be based on at least the first output of the neural network and the second output of the neural network.

Figure 5:
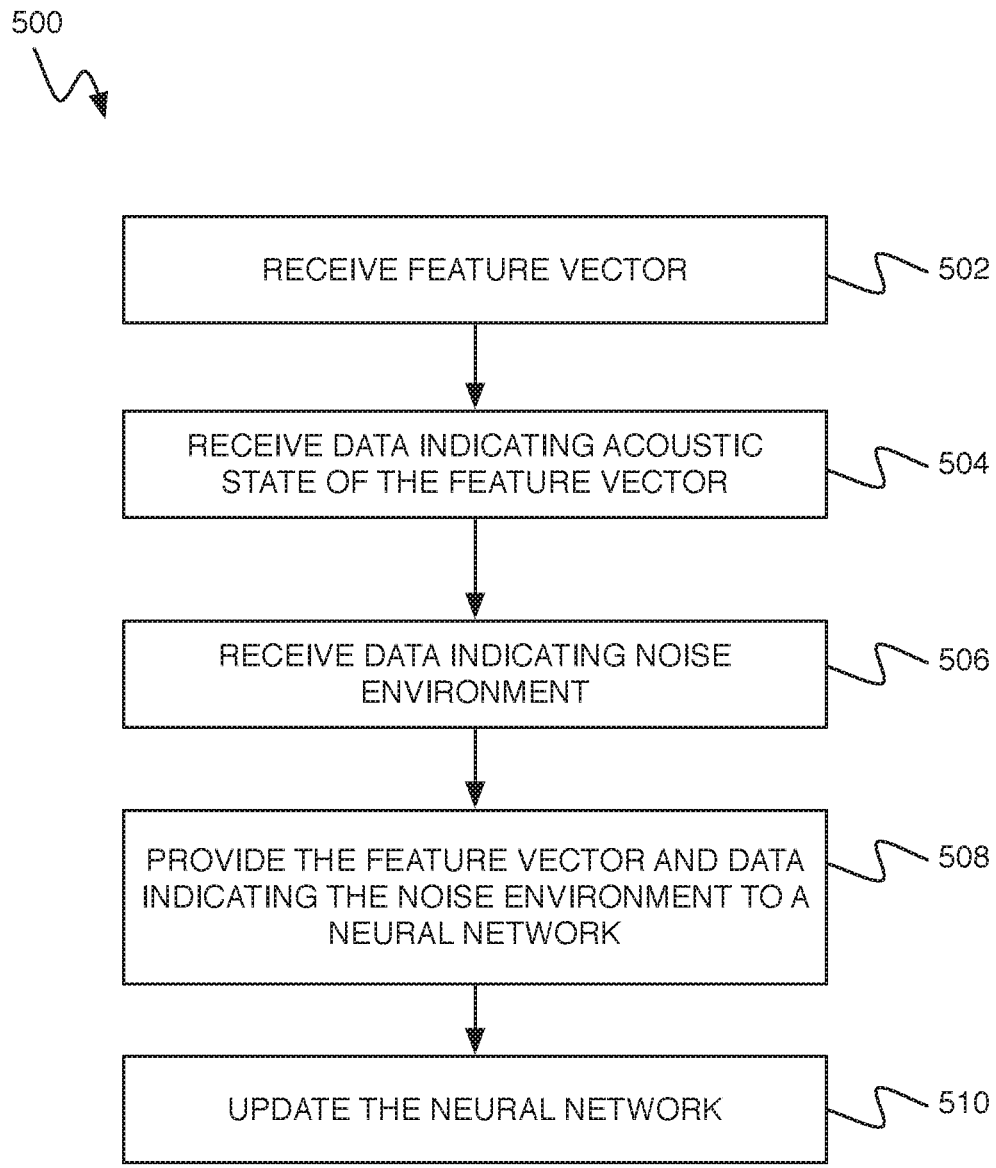
FIG. 5 is a flow diagram that illustrates an example of a process 500 for training a neural network.

FIG. 5 is a flow diagram that illustrates an example of a process 500 for training a neural network. The process 500 may be performed by data processing apparatus, such as the computing system 120 described above or another data processing apparatus.

A feature vector is received (502). The feature vector models audio characteristics of a portion of an utterance. The feature vector can include values that indicate acoustic features for each of multiple dimensions. In some implementations, multiple feature vectors are received. For example, a set of acoustic feature vectors that correspond to multiple consecutive widows of an utterance can be received. The set may include a central feature vector and contextual feature vectors that indicate the context that occurs before and/or after the central feature vector.

Data is received that indicates an acoustic state of the received feature vector (504). As an example, a label for the feature vector may indicate that the feature vector represents the ah1 acoustic state, or the zh3 acoustic state, or another acoustic state.

Data indicative of the noise environment is received (506). The data can be a noise-vector indicating long term noise characteristics of the utterance from which the received feature vector was extracted. The noise-vector may be computed from feature vectors for the utterance, or the noise-vector may be accessed from data storage or another system.

The feature vector and the noise-vector is provided as input to a neural network (508). Multiple feature vectors may be provided as part of the input. For example, a set of input data to the neural network may include a central feature vector, contextual feature vectors, and a noise-vector provided simultaneously at an input layer of the neural network.

The neural network is updated (510). Forward propagation through the neural network produces outputs at an output layer of the neural network. The outputs may be compared with data indicating correct or desired outputs that indicate that the received feature vector corresponds to the acoustic state indicated in a received label for the feature vector. A measure of error between the actual outputs of the neural network and the correct or desired outputs is determined. The error is then back-propagated through the neural network to update the weights within the neural network.

The process 500 may be repeated for feature vectors extracted from multiple different utterances in a set of training data. For each utterance or audio recording in the training data, a noise-vector may be calculated based on characteristics of the utterance as a whole. Whenever a feature vector for a particular utterance is provided as input to the neural network, the noise-vector calculated for the particular utterance may also be input to the neural network at the same time. During training, the frames selected for training can be selected randomly from a large set, so that frames from the same utterance are not processed consecutively.

Figure 6:
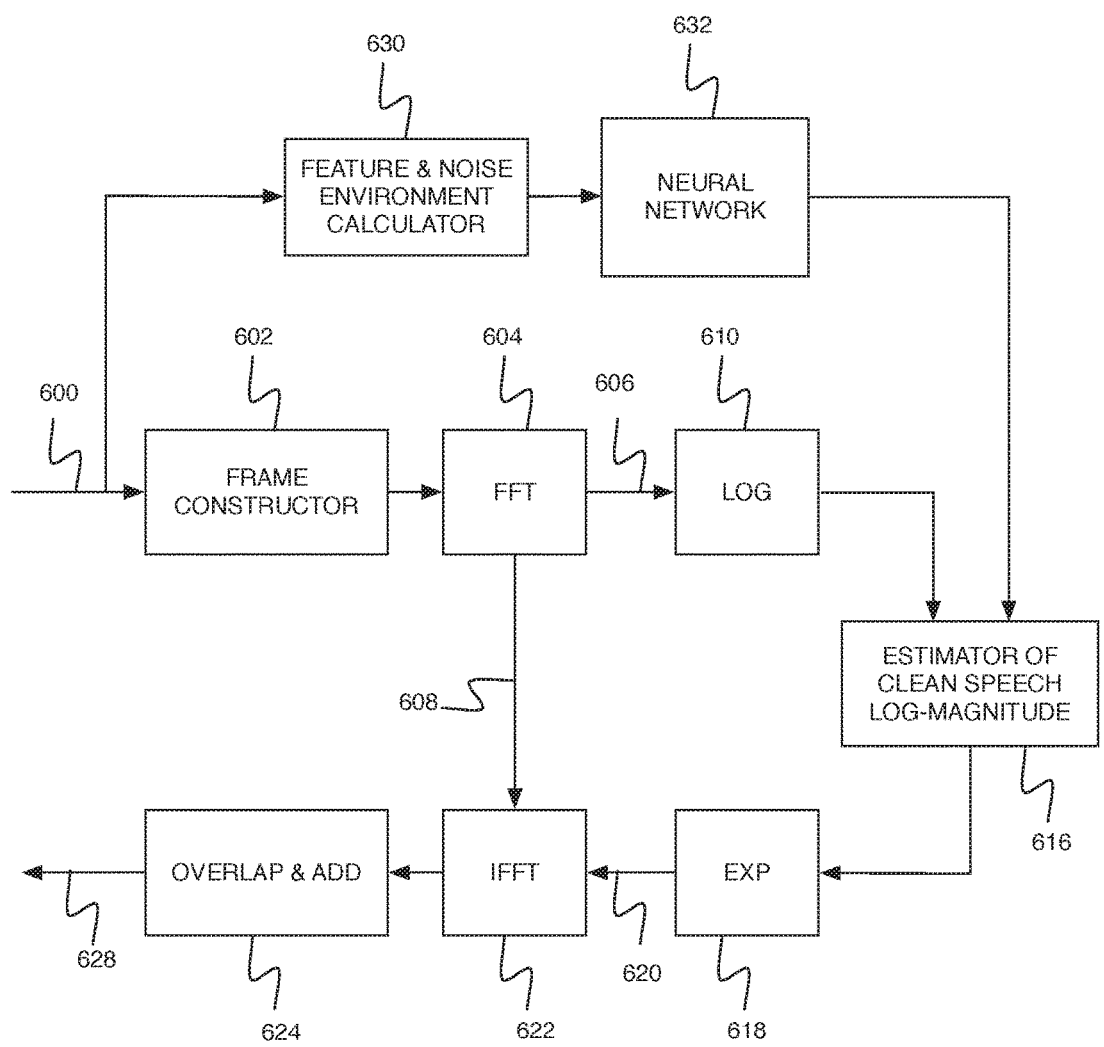
FIG. 6 is a block diagram of a speech enhancement system under one embodiment of the present invention.
Figure 7:
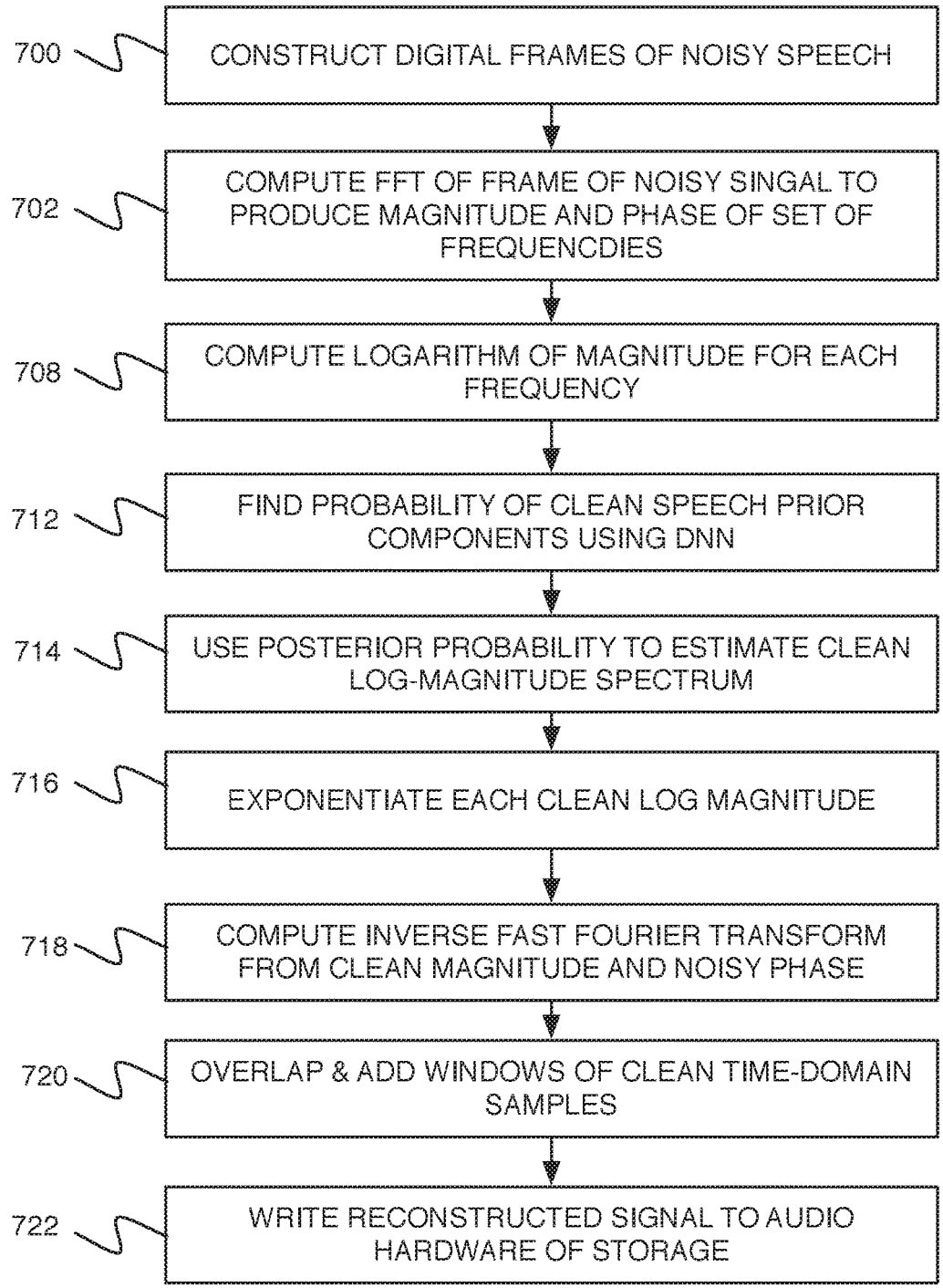
FIG. 7 is a flow diagram of a speech enhancement method under one embodiment of the present invention.

The present invention provides a method and apparatus for reconstructing a speech signal from a noisy signal. FIG. 6 provides a block diagram of the system and FIG. 7 provides a flow diagram of the method of the present invention.

At step 700, a noisy analog signal 600 is converted into a sequence of digital values that are grouped into frames by a frame constructor 602. Under one embodiment, the frames are constructed by applying analysis windows to the digital values where each analysis window is a 25 millisecond hamming window, and the centers of the windows are spaced 10 milliseconds apart.

At step 702, a frame of the digital speech signal is provided to a Fast Fourier Transform 604 to compute the phase and magnitude of a set of frequencies found in the frame. Under one embodiment, Fast Fourier Transform 604 produces noisy magnitudes 606 and phases 608 for 128 frequencies in each frame. The phases 608 for the frequencies are stored for later use. A log function 610 is applied to magnitudes 606 at step 708 to compute the logarithm of each magnitude.

At step 712 the audio signal is provided to the feature and noise environment calculator 630 which computes the feature vector 245 and noise vector 380. The feature and noise vectors are provided to the Neural Network 270, 632 which calculates acoustic state posteriors $P(s_{i,j}|Y,N_j)$ at step 712.

At step 714 the posterior probability and the log spectrum vector from 61 are used to compute an estimate of the clean log magnitude spectrum $\hat{x}$ using an estimator 616. Under one embodiment, the estimate of the clean log magnitude spectrum is a weighted average of the minimum mean square error estimates $\hat{x}_{i,j}$ calculated from each of the mixture components of the posterior probability and weighted by the acoustic state posteriors $P(s_{i,j}|Y,N_j)$.

Under one embodiment, a target speech mixture model is used consisting of a mixture of different posterior components, each having a mean and variance. Under one specific embodiment, a mixture model consisting of 512 male speaker mixture components and 512 female speaker mixture components is used.

The estimated clean signal log magnitude values are exponentiated at step 716 by an exponent function 618 to produce estimates of the clean magnitudes 620. At step 718, an inverse Fast Fourier Transform 622 is applied to the clean magnitudes 620 using the stored phases 608 taken from the noisy signal at step 702 above. The inverse Fast Fourier Transform results in a frame of time domain digital values for the frame.

At step 720 an overlap and add unit 626 is used to overlap and add the frames of digital values produced by the inverse Fast Fourier Transform to produce a clean digital signal 628. Under one embodiment, this is done using synthesis windows that are designed to provide perfect reconstruction when the analyzed signal is perfect and to reduce edge effects.

The output clean digital signal 628 can then be written to output audio hardware so that it is perceptible to users or stored at step 722.

In one embodiment, Gaussian Mixture Models (GMMs) are used for the component signals in the log spectrum domain $$p(x) = \sum_i p_i(x) = \sum_i \pi_i N(x; \mu_i, \Sigma_i). \tag{6}$$

where $\pi_i$ is the mixture weight, $\mu_i$ is the mixture mean, and $\Sigma_i$ is the covariance matrix for mixture i.

The clean speech prior Gaussian mixture model p(x) is constructed in such a way that the indexes of the acoustic states $s_i$ of the Neural Network correspond to the indexes of the components of the Gaussian Mixture Model. For example, the clean speech training data can be processed by the Neural Network to provide class posteriors for each frame. The class posteriors are used in the Expectation Maximization (EM) training algorithm for GMM training.

The noise speech prior Gaussian mixture model p(n) can be trained by the GMM Training module 350 that is part of the Noise Environment Module 320 or directly from the acoustic signal.

The observed signal $y_{obs}$ is assumed to be an acoustic mixture of the target speech signal x and noise or interference signal n. Under one embodiment, this equation is of the form:

$$y \approx x + \ln(1 + \exp(n-x)) \quad (7)$$

where y is an observed noisy feature vector, a clean signal feature vector, and n is a noise feature vector.

The MMSE estimate for the separated target signal $\hat{x}$ is:

$$\hat{x} = E[x \mid y_{obs}] = \quad (8)$$
$$z \int x \cdot p(y_{obs}, x, n) dx dn = z \sum_{i,j} \int x \cdot p(y_{obs} \mid x, n) p_i(x) p_j(n) dx dn,$$

where $p(y_{obs}|x,n)$ is the observation likelihood, $p_i(x)$ is i-th component of the target speaker prior model, $p_j(n)$ is j-th component of the noise prior model and $z=(y_{obs})^{-1}$. The target prior speaker model p(x) can e.g. be a Gaussian Mixture Model and the noise or interference model p(n) can e.g. be a Gaussian Mixture Model trained by the GMM Training module 350 that is part of the Noise Environment Module 320.

In the current invention, the MMSE estimate is be approximated as:

$$\hat{x}_1 = E[x_1 \mid y_{obs}] \approx \sum_{i,j} \hat{x}_{i,j} P(s_{i,j} \mid Y, N_j) \quad (9)$$

where the component weight $P(s_{i,j}|Y,N_j)$ are the acoustic model component posterior probabilities as computed by the Neural Network 273.

The $\hat{x}_{i,j}$ are posterior clean speech estimates of each mixture component combination i, j of the joint probability $p(y_{obs},x,n)$. The posterior clean speech estimates can be computed using a number of methods, including the Algonquin algorithm U.S. Pat. No. 6,985,858 (Frey et al.).

The method described herein introduces new methods for determining the posterior probabilities $P(s_{i,j}|Y,N_j)$ using a neural network as has been described above that can be more accurate than the methods used in the prior art.

Additionally, this invention introduces a new method for determining the component clean speech estimates $\hat{x}_{i,j}$ as will be described below.

To find the clean speech estimates $\hat{x}_{i,j}$, the current invention uses the method of finding the x component of the maximum point $(x,n)_{i,j}$ of the joint probability $p_{i,j}(y_{obs},x,n)$ for each mixture combination i of the speech model and j of the noise model.

The observation likelihood p(y|x,n) in Equation 8 is approximated as a delta function $\delta(y-(x+n))$ in the current invention. In the log domain the mixture likelihood relationship is:

$$y = \ln(\exp(x) + \exp(n)) \quad (10)$$

This can be rewritten as $$n = \ln(\exp(y) - \exp(x)) \quad (11)$$

The method finds the maximum combination of x and n under the prior p(x)p(n) speech and noise models. The prior speech and noise models for each combination i, j are Gaussians.

$$p_i(x)p_j(n) = N(x;\mu_i,\Sigma_i)N(n;\mu_j,\Sigma_j) \quad (12)$$

Inserting Eqn. 11 into the prior Eqn. 12 produces a function for each component of the log spectrum.

$$g_{i,j}(x) = N(x;\mu_i,\sigma_i)N(\ln(\exp(y)-\exp(n));\mu_j,\sigma_j) \quad (13)$$

that can be maximized with respect to x to find $$\hat{x}_{i,j} = \max_x g_{i,j}(x). \quad (14)$$

The function g(x) has the same extremum points as $f(x)$ where $$f_{i,j}(x) = \frac{(\ln(e^y - e^x) - \mu_j)^2}{\sigma_j^2} + \frac{(x-\mu_i)^2}{\sigma_i^2} \quad (15)$$

so maximizing $f_{i,j}(x)$ will also maximize $g_{i,j}(x)$ $$\hat{x}_{i,j} = \max_x g_{i,j}(x) = \max_x f_{i,j}(x) \quad (16)$$

The above function is optimized with respect to x. This can be achieved using the Newton Raphson method. The Newton Raphson method requires the first and second derivatives of $f(n)$. The first derivative is:

$$f'(x) = a\frac{e^x(\ln(e^y - e^x) - \mu_j)}{e^x - e^y} + b \cdot x + c \quad (17)$$

Where $a=-2/\sigma_j$, $b=2/\sigma_i^2$ and $c=2\mu_i/\sigma_i^2$. The second derivative is $$f''(x) = a\frac{e^x(-e^y\mu_j + e^y\ln(e^y - e^x) - e^x)}{(e^x - e^y)^2} + b \quad (18)$$

The estimate for the optimum of $f(x)$ is found by iterating the following equation:

$$x_{k+1} = x_k - \frac{f'(x_k)}{f''(x_k)} \quad (19)$$

where $x_k$ is the estimate for $\hat{x}$ at the k-th iteration.

The initial iteration point $x_0$ can be set to the current observation $y_t-d$ where d can be a positive constant for frame $w_t$, or can for example be set to the constructive intersection of the spectral intersections method as described in "Spectral intersections for non-stationary signal separation" (Trausti Kristjansson and Thad Hughes).

Equation 19 can be iterated until the process converges or a fixed number of times. Once the desired number of iterations has been computed, the final clean speech estimate is produced $$\hat{x}_{i,j} = x_K \quad (20)$$

where $x_K$ is the estimate of the last iteration K of Equation 19.

Figure 8:
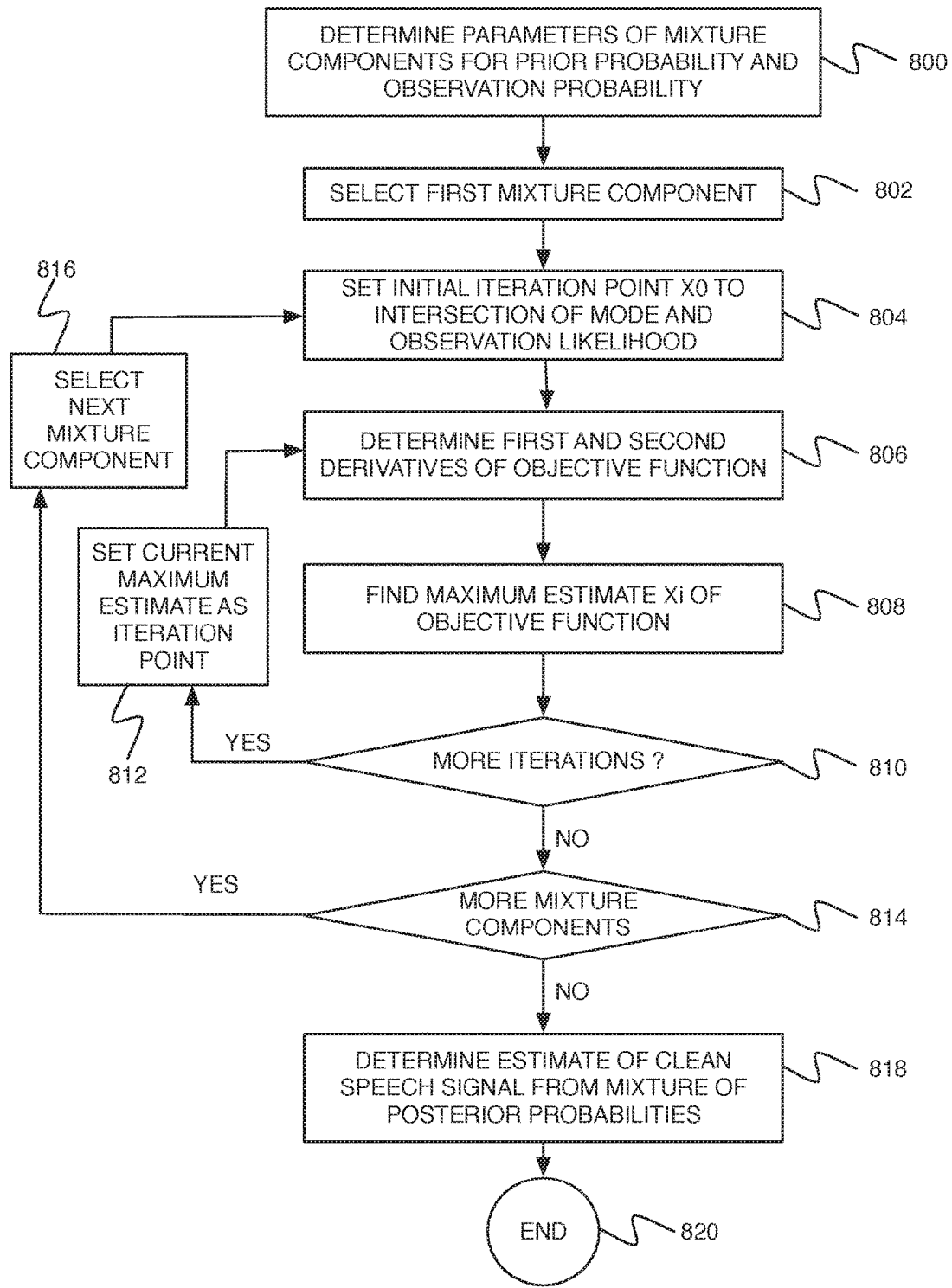
FIG. 8 is a flow diagram for determining an estimate of a clean signal given a noisy signal under one embodiment of the present invention.

The iterative process for determining the clean speech estimates $\hat{x}_{i,j}$ is shown in steps 804, 806, 808, 810 and 812 of FIG. 8. At step 804, the expansion point equal to the observation $y_{obs}$–d or the construction spectral intersection. At step 806, equations 17 and 18 are used to determine the first and second derivatives of $f_{i,j}(x)$.

At step 808, the first and second derivatives are used in equation 19 to update the clean speech estimate. After the clean speech estimate base been updated, the process determines if more iterations should be performed at step 810.

If more iterations are to be performed, the current iteration point $x_k$ is set as the past iteration point $x_{k-1}$ at step 812 so that the current estimate for the clean speech log spectrum is used as the expansion point in the next iteration. The process then returns to step 806. Steps 806, 808, 810 and 812 are then repeated until the desired number of iterations has been performed.

After the clean speech log spectrum estimate $\hat{x}_{i,j}$ for the first mixture component of the posterior probability has been determined, the process of FIG. 8 continues by determining whether there are more mixture components at step 814. If there are more mixture components, the next mixture component is selected at step 816 and steps 804, 806, 808, 810 and 812 are repeated for the new mixture component.

Once a clean speech log spectrum estimate $\hat{x}_{i,j}$ has been determined for each mixture component of the posterior probability, the process of FIG. 8 continues at step 818 where the mixture components are combined using the acoustic state posteriors $P(s_{i,j}|Y,N_j)$ provided by the neural network to identify a most likely clean signal feature vector $\hat{x}$ given the observed noisy signal feature vector, using equation 9.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A method of identifying a clean speech signal from a noisy speech signal, the method comprising:
    a speech model comprising a gaussian mixture model for a log-magnitude speech signal;
    a noise model comprising a gaussian mixture model for a log-magnitude noise signal;
    a plurality of mixture combinations wherein each mixture combination contains at least one component of the speech model and at least one component of the noise model;
    receiving a plurality of frames representing the noisy speech signal;
    identifying a set of features comprising at least a set of log-magnitude frequency values for each of the plurality of frames;
    receiving as input to a neural network at least a subset of the features;
    determining, by the neural network, a selection of one or more of the mixture combinations that correspond to a most likely combination of components from the speech and noise models for each frame of the noisy speech signal;
    determining a plurality of posterior probability distributions each of which corresponding to one of the plurality of the mixture combinations and a segment of the noisy speech signal;
    determining parameters of at least one maximum point for each posterior probability distribution based on the features of the noisy speech signal, the maximum point of the posterior probability distribution providing a log-magnitude frequency value for an estimate of the clean speech signal;
    using the selection of one or more mixture combinations and the parameters of the maximum point of each posterior probability distribution to estimate a set of log-magnitude frequency values, and
    converting the estimated set of log-magnitude frequency values to obtain the clean speech signal.

2. The method of claim 1, wherein determining a most likely combination of components from the speech and noise models comprises utilizing a neural network to determine output weights, where the neural network is configured to:
    receive a feature vector that models audio characteristics of a portion of an utterance;
    receive data indicative of a noise environment;
    provide, as input to the neural network, the feature vector and the data indicative of the noise environment;
    determine a candidate phonetic sequence for the utterance based on at least an output of the neural network, and
    determine a candidate mixture combination sequence for the utterance based on at least an output of the neural network.

3. The method of claim 1, further comprises finding an x component of a maximum point $(x,n)_{i,j}$ of a joint probability $p_{i,j}(y_{obs}, x,n)$ for each mixture combination i of a speech model and j of a noise model, where $y_{obs}$ is an observed noisy signal vector, x is a clean signal vector and n is a noise vector.

4. The method of claim 3, further comprises approximating an observation likelihood $p(y|x,n)$ as a delta function $\delta(y-(x+n))$, wherein a mixture likelihood relationship is:

$$n=\ln(\exp(y)-\exp(x))$$

where y is a noisy signal vector.

5. The method of claim 4, further comprises finding a maximum combination of x and n under a prior $p(x)p(n)$ speech and noise models, wherein $p(x)$ is a prior speech model and $p(n)$ is a prior noise model, and wherein component speech and noise models for each combination i, j are gaussians, $$p_i(x)p_j(n)=N(x;\mu_i,\sigma_i)N(n;\mu_j,\sigma_j)$$

wherein $N(x; \mu_i, \sigma_i)$ is a gaussian probability distribution for speech and $N(n; \mu_j, \sigma_j)$ is a gaussian probability distribution for noise and wherein $\mu_i$ is a mean of the gaussian probability distribution for speech and $\sigma_i$ is a covariance of the gaussian probabilty distribution for speech and $\mu_j$ is a mean of the gaussian probability distribution for noise and $\sigma_j$ is a covariance of the gaussian probabilty distribution for noise.

6. The method of claim 4, wherein the mixture likelihood relationship inserted into the prior speech and noise models for each combination i, j produces a function for each component of a log spectrum, $$g_{i,j}(x)=N(x;\mu_i,\sigma_i)N(\ln(\exp(y)-\exp(x));\mu_j,\sigma_j)$$

werein $g_{i,j}(x)$ is an objective function that is maximized with respect to x to find:

$$\hat{x}_{i,j}=\max_x g_{i,j}(x)$$

where $\hat{x}_{i,j}$ is an extremum point.

7. The method of claim 6, wherein the function $g_{i,j}(x)$ has same extremum points as an objective function $f_{i,j}(x)$ where $$f_{i,j}(x) = \frac{(\ln(e^y - e^x) - \mu_j)^2}{\sigma_j} + \frac{(x - \mu_i)^2}{\sigma_i}$$

and wherein maximizing $f_{i,j}(x)$ maximizes $g_{i,j}(x)$ $$x_{i,j} = \max_x g_{i,j}(x) = \max_x f_{i,j}(x).$$

8. The method of claim 7, further comprises optimizing the objective function $f(x)$ with respect to x and wherein an estimate for an optimum of $f(x)$ is $$x_{k+1} = x_k - \frac{f'(x_k)}{f''(x_k)}$$

wherein a first derivative is $$f'(x) = a\frac{e^x(\ln(e^y - e^x) - \mu_j)}{e^x - e^y} + b \cdot x + c$$

wherein $a=-2/\sigma_j$, $b=2/\sigma_i^2$ and $c=2\mu_i/\sigma_i^2$ and wherein a second derivative is $$f''(x) = a\frac{e^x(-e^y\mu_j + e^y\ln(e^y - e^x) - e^x)}{(e^x - e^y)^2} + b$$

and where $x_k$ is an estimate for $\hat{x}$ at iteration k.

9. The method of claim 1, further comprising setting an initial iteration point $x_0$ to an intersection of a mode and observation likelihood, determining first and second derivatives of an objective function, and finding maximum estimate x of the objective function.

10. The method of claim 1, wherein determining a posterior probability comprises using an iterative process to determine a posterior probability.

11. The method of claim 1, wherein determining a posterior probability comprises determining a separate posterior probability for each mixture component in a set of mixture components.

12. The method of claim 1, wherein computing on a desired number of iterations, a clean speech estimate for each mixture combination is produced by, $$\hat{x}_{i,j} = x_K$$

where $x_K$ is a speech estimate of a last iteration K.

13. The method of claim 1, wherein determining a final clean speech estimate feature vector $\hat{x}$ comprises finding weighs for each of the speech estimates based on the output of the neural network, and finding a weighed combination of the estimates $\hat{x}_{i,j}$.

* * * * *